United States Patent Office 3,758,467
Patented Sept. 11, 1973

3,758,467
ANTHRAQUINONE DYESTUFFS
Karl Seitz, Oberwil, Basel-Land, Guenter Klahre, Reinach, Basel-land, and Hans-Ulrich Schuetz, Basel, Switzerland, assignors to Ciba-Geigy AG, Basel, Switzerland
No Drawing. Continuation-in-part of abandoned application Ser. No. 825,079, May 15, 1969. This application Aug. 11, 1971, Ser. No. 178,527
Int. Cl. C07d 55/18
U.S. Cl. 260—249    12 Claims

ABSTRACT OF THE DISCLOSURE

Anthraquinone dyestuffs which correspond to the general formula

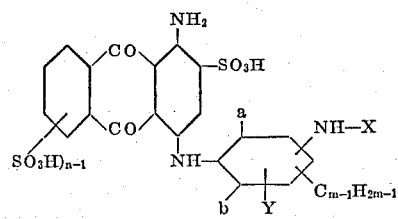

in which $m$ and $n$ each represents an integer not greater than 2, $a$ and $b$ each represents a low-molecular alkyl residue, X represents a 4-halogeno-1,3,5-triazine residue bound at 6-position to the NH group through the ring carbon atom and which carries an etherified hydroxyl group at 2-position, and Y represents a sulphonic acid group, a low-molecular alkyl group or a hydrogen atom, are valuable dyestuffs of increased reactivity suitable for printing cotton and regenerated cellulose. The prints obtained with said dyestuffs are distinguished by their very good fastness to light and by their outstanding properties of wet fastness.

CROSS-REFERENCE TO RELATED APPLICATION

This is a continuation-in-part application of our copending application Ser. No. 825,079, filed May 15, 1969 now abandoned.

The present invention provides new dyestuffs of the anthraquinone series which correspond to the general formula

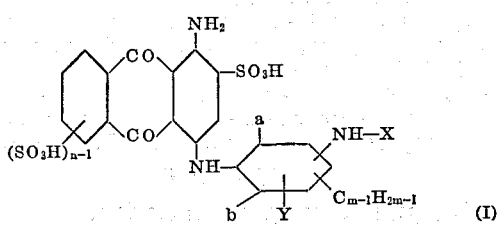

in which $m$ and $n$ each represents an integer not greater than 2, $a$ and $b$ each represents a low-molecular alkyl residue, preferably a methyl residue, X represents a 4-halogeno-1,3,5-triazine residue bound to the NH group at 6-position through the ring carbon atom and which carries an etherified hydroxyl group in the 2-position, and Y represents a sulphonic acid group, a lower-molecular alkyl group, preferably a methyl group, or a hydrogen atom.

The present invention also provides a process for preparing dyestuff of the above Formula I which comprises condensing an anthraquinone dyestuff of the formula

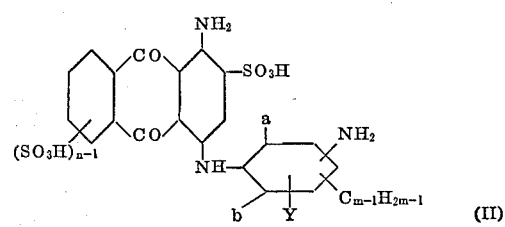

in which $a$, $b$, Y, $n$ and $m$ have the meanings given above, with a 4,6-dihalogeno-1,3,5-triazine containing an etherified hydroxyl group in the 2-position.

Anthraquinone dyestuffs of the kind defined that are used in the process of the invention are preferably of the kind in which the substituents $a$ and $b$ are identical; examples are 1-amino-4-(4'-amino-2',3',5',6'-tetramethylphenylamino)-anthraquinone-2-sulphonic acid, 1-amino-4-(4'-amino-2',3',5',6' - tetramethylphenylamino)-anthraquinone-2,5-, -2,6-, -2,7- or -2,8-disulphonic acid, 1-amino-4-(3' - amino - 2',4',6' - trimethylphenylamino)-anthraquinone-2,5'-disulphonic acid and the corresponding -2,5' 6-trisulphonic acid.

The 4,6-dihalogeno - 1,3,5 - triazines containing an etherified hydroxyl group in the 2-position that are condensed with the anthraquinone dyestuffs are, for example, the monocondensation products of cyanuric chloride or cyanuric bromide with the following hydroxyl compounds: phenol, para-cresol, orthochlorophenol, methanol, ethanol, propanol-(1), propanol-(2), butanol-(1), allylalcohol, proparglyalcohol,
2-methoxy- and 2-ethoxy-ethanol,
3-(1-methyl-ethoxy)-propanol-(1),
2-methylpropanol-(1),
pentanol-(1),
3-methylbutanol-(1),
2-methylbutanol-(1),
hexanol-(1),
2,2-dimethylpentanol-(1),
2-chloroethanol,
3-chloropropanol-(1),
2-butyloxyethanol-(1),
3-methoxybutanol-(1),
2,(2-methoxyethoxy)-ethanol-(1),
2-ethoxyethoxymethanol,
2-ethylmercaptoethanol-(1),
2-phenoxyethanol-(1),
cyclohexylmethanol,
2-hydroxyethylacetate,
tetrahydrofurfurylalcohol,
2-buten-1-ol,
glycollic acid,
1-methyl-2-ethoxyethylalcohol,
1-methyl-2-methoxyethylalcohol,
butanol-(2),
hexanol-(2),
1,3-diethoxypropanol-(2),
3-methylbutanol-(2),
cyclopentanol,
cyclohexanol,
2-methylcyclohexanol,
3-hydroxytetrahydrofuran,
benzylalcohol,
pentanol-(3), ortho-hydroxybenzylalcohol,
paramethoxybenzylalcohol,
3-phenylallylalcohol,
phenol-2- or -4-sulphonic acid,
phenol-2,4-disulphonic acid,
phenol-2-carboxylic acid,
3-methoxy-propanol, and
2-propyloxy-ethanol.

When aromatic hydroxy compounds are used for the etherification, the etherification process may also be carried out after condensation of the anthraquinone dyestuff with the trichlorotriazine.

The condensation process in accordance with the invention can be carried out in manner known per se, for example, in aqueous medium in the presence of an agent capable of binding acid, for example, sodium hydroxide or sodium carbonate.

The dyestuffs obtained in accordance with the process of the invention are new. They are valuable dyestuffs of increased reactivity and can be used for dyeing and printing a very wide variety of materials, for example, wool, but especially polyhydroxylated materials of fibrous structure, for example, cellulosic materials, including both man-made fibres, for example, regenerated cellulose fibres, and naturally occurring cellulosic materials, for example, pulp, linen and especially cotton.

However, they are specially suitable for printing cotton and regenerated cellulose, for example spun viscose. The prints obtained are advantageously fixed by the so-called "steaming" process, wherein the dried material is exposed to saturated steam having a temperature of 102 to 103° C. for a short period, preferably 1 to 2 minutes. The new dyestuffs yield fast prints that are distinguished by their high degree of colour intensity and by their purity of shade; any unfixed dyestuff can easily be washed out. To improve the fastness to wet treatments it is advantageous to subject the dyeings and prints to a thorough rinse with cold and hot water, if necessary, in the presence of an agent that assists the dispersion and diffusion of any unfixed dyestuff.

The dyeings and prints are further distinguished by their very good fastness to light and by their outstanding properties of wet fastness as which may specially be mentioned the fastness to water and the fastness to wet hot pressing.

The following examples illustrate the invention, the parts and percentages being by weight, unless otherwise stated. The relationship between parts by weight and parts by volume is the same as that between the gram and the cubic centimetre.

EXAMPLE 1

53.1 parts of the dyestuff of the formula

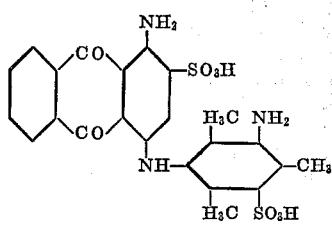

are suspended in 1,000 parts of water and the pH is adjusted to 7 with sodium hydroxide solution. The solution obtained is cooled to 0 to 5° C. and then a fine suspension of 18.5 parts of cyanuric chloride in 150 parts of ice-water is added. The pH of the reaction mixture drops to about 2 and then, after 1 to 2 hours, the pH of the solution is again adjusted to 7, for which about 50 parts of 2 N sodium hydroxide solution are needed. A solution comprising 9.4 parts of phenol, 50 parts of 2 N sodium hydroxide solution and 800 parts of water is added to the solution of the dichloro-triazine dyestuff, and the reaction mixture is stirred overnight at room temperature. The dyestuff formed is salted out by the addition of sodium chloride, isolated by filtration and dried in vacuo. The product so obtained dyes cotton a very pure reddish blue shade.

EXAMPLE 2

53.1 parts of the dyestuff of the formula shown in Example 1 are suspended in 1,000 parts of water and the pH is adjusted to 7 with sodium hydroxide solution. A fine suspension of 18.0 parts of 2-methoxy-4,6-dichloro-1,3,5-triazine in 100 parts of ice-water is added to the solution so obtained at room temperature. The pH is kept at between 6 and 7 during the condensation process by the dropwise addition of sodium hydroxide solution, about 50 parts of 2 N sodium hydroxide solution being needed. After complete acylation of the amino group, the monochlorotriazine dyestuff formed is salted out by the addition of sodium chloride, isolated by filtration and dried in vacuo. The product so obtained yields very pure reddish blue prints on cotton.

EXAMPLE 3

53.1 parts of the dyestuff of the formula shown in Example 1 are suspended in 500 parts of water and the pH of the mixture is adjusted to 7 with sodium hydroxide solution. 25 parts of 6-(2-ethoxyethoxy)-2,4-dichloro-1,3,5-triazine are added dropwise to the solution so obtained during about 1 hour at room temperature, and the pH is kept within the range of from 5 and 6 during condensation by the simultaneous dropwise addition of sodium hydroxide solution. To complete the reaction, the pH is adjusted to 7 and the reaction mixture is heated for 1 to 2 hours at 40 to 45° C. until the pH does not deviate from 7 at that temperature. After acylation, the dyestuff is evaporated to dryness in vacuo. The product so obtained yields a very pure reddish blue print on cotton.

When 6 - (2-ethoxyethoxy)-2,4-dichloro-1,3,5-triazine is replaced by a corresponding amount of 6-ethoxy- or 6-(1-methylethoxy)-2,4-dichloro-1,3,5 - triazine for the acylation of the dyestuff of the formula

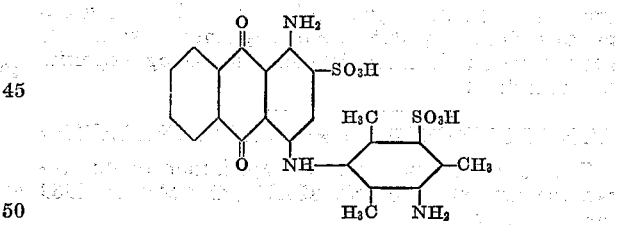

dyestuffs are still produced that dye cotton pure, reddish blue shades.

Further dyestuffs that dye cotton pure, reddish blue shades may be obtained by using as the acylating agent a 2,4-dichloro-1,3,5-triazine that contains in the 6-position a cyclohexyloxy, 1 - methylpropyloxy, 1-ethylpropyloxy, phenoxy, butyloxy, propyloxy, 2-methoxyethoxy, tetrahydrofurfuryloxy, 2 - (2-ethoxyethoxy)-ethoxy, propargyloxy, allyloxy, 3 - methoxypropyloxy, 2 - propyloxyethoxy, or 1 - methyl - 2 - methoxy - ethoxy residue and following the procedure described in Example 3.

EXAMPLE 4

54.5 parts of the dyestuff of the formula

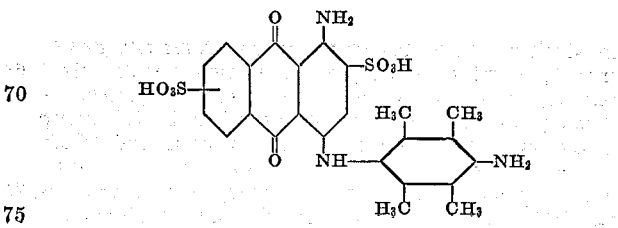

(mixture of 1 - amino - 4 -(4' - amino-2',3',5',6'-tetramethylphenylamino) - anthraquinone - 2,6,- and -2,7-disulphonic acid) are suspended in 2,500 parts of water, and the pH of the mixture is adjusted to 7 with sodium hydroxide solution. The solution so obtained is then reacted successively with cyanuric chloride and a sodium phenolate solution in the manner described in Example 1. The dyestuff so obtained produces cotton very pure greenish blue prints.

EXAMPLE 5

25 parts of 6 - (2-ethoxyethoxy)-2,4-dichloro-1,3,5-triazine are added to a neutral solution of 54.5 parts of the dyestuff of the formula shown in Example 4, and the pH is kept at between 6 and 7 during the condensation process by the simultaneous dropwise addition of sodium hydroxide solution. To complete the reaction, the reaction mixture is heated for 1 to 3 hours at 40 to 45° C. The dyestuff which forms is salted out by the addition of sodium chloride, isolated by filtration and dried in vacuo. The product so obtained yields very pure greenish blue prints on cotton.

Similar dyestuffs which dye cotton blue shades may be obtained by replacing the 6-(2-ethoxyethoxy)-2,4-dichloro-1,3,5-triazine with 6-(1-methylethoxy)- or 6-phenoxy-2,4-dichloro-1,3,5-triazine in the condensation process.

Dyeing procedure 2 parts of one of the dyestuffs obtained in the manner described in the preceding examples are dissolved in 100 parts of water in the presence of 0.5 part of sodium meta-nitro-benzenesulphonate. A cotton fabric is impregnated with the solution so obtained in a manner such that its weight is increased by 75% and then dried.

The fabric is then impregnated with a solution containing 5 grams of sodium hydroxide and 300 grams of sodium chloride per litre and having a temperature of 20° C., squeezed to a weight increase of 75%, steamed for 20 to 30 seconds at 100 to 101° C., soaped at the boil for 15 minutes in a 0.3% solution of a non-ionic detergent, rinsed and dried. The dyeing so obtained is fast to washing. A good result similar to that obtained on cotton is also obtained on a fabric made of regenerated cellulose staple fibre.

Printing procedure 2 parts of one of the dyestuffs obtained in the manner described in the preceding examples is strewn into 100 parts of a stock thickening containing 45 parts of 5% sodium alginate thickening, 32 parts of water, 20 parts of urea, 1 part of sodium meta-nitrobenzenesulphonate and 2 parts of sodium bicarbonate while stirring rapidly.

A cotton fabric is printed with the printing paste so obtained on a roller-printing machine and steamed for 1 to 2 minutes at 100° C. in saturated steam. The printed fabric is then thoroughly rinsed in cold and hot water, which easily removes any dyestuff which is not chemically fixed on the fibre, and then dried.

What is claimed is:

1. A dyestuff of the formula

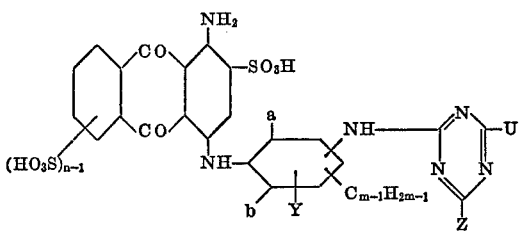

in which $n$ and $m$ each is 1 or 2, $a$ and $b$ each is low-molecular alkyl, Y is hydrogen, the sulfonic acid group or low-molecular alkyl, Z is chlorine or bromine and U is alkoxy up to 6 carbon atoms, alkoxyalkoxy up to 6 carbon atoms, alkoxyalkoxyalkoxy up to 6 carbon atoms, allyloxy, propargyloxy, cyclohexyloxy, tetrahydrofurfuryloxy or phenyloxy.

2. A dyestuff as claimed in claim 1, wherein $a$ and $b$ each represents a methyl group.

3. A dyestuff as claimed in claim 1 or 2, wherein Y represents a methyl group.

4. A dyestuff as claimed in any one of the claims 1 to 3, wherein Z is chlorine and U is low-molecular alkoxyethoxy or alkoxypropyloxy.

5. A dyestuff as claimed in claim 4, wherein U is methoxyethoxy or ethoxyethoxy.

6. A dyestuff as claimed in claim 1, of the formula

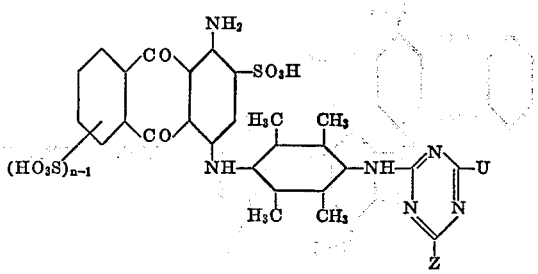

wherein $n$ is 1 or 2 and Z and U have the meanings given in claim 1.

7. A dyestuff as claimed in claim 1, of the formula

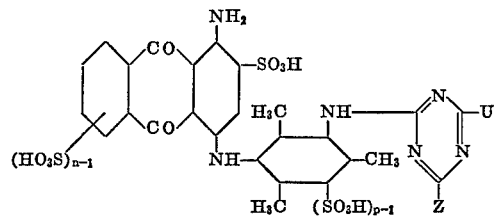

wherein $n$ and $p$ each is 1 or 2 and Z and U have the meanings given in claim 1.

8. A dyestuff as claimed in claim 1, of the formula

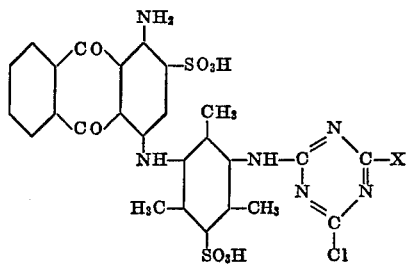

wherein X is alkoxy up to 6 carbon atoms, alkoxyalkoxy up to 6 carbon atoms, alkoxyalkoxyalkoxy up to 6 carbon atoms, allyloxy, propargyloxy, cyclohexyloxy, tetrahydrofurfuryloxy or phenyloxy.

9. The dyestuff of the formula

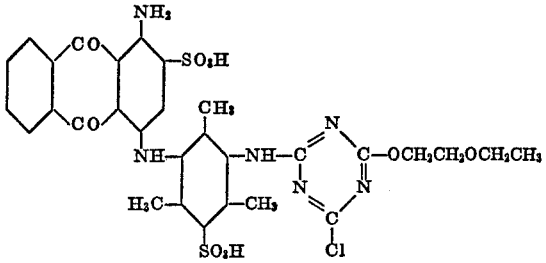

10. The dyestuff of the formula
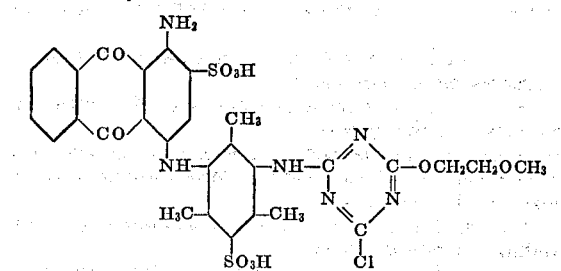
11. The dyestuff of the formula
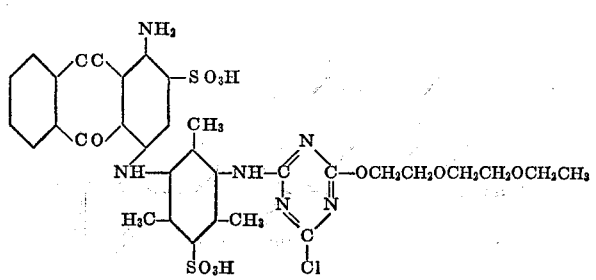
12. The dyestuff of the formula
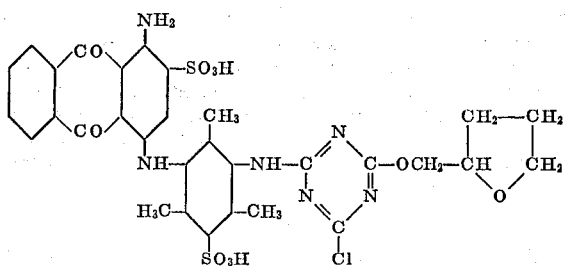
References Cited
UNITED STATES PATENTS
| | | | |
|---|---|---|---|
| 2,889,323 | 6/1959 | Heslop | 260—249 |
| 3,065,191 | 11/1962 | Heslop et al. | 260—249 X |
| 3,408,345 | 10/1968 | Bien et al. | 260—249 X |
| 3,558,620 | 1/1971 | Bien et al. | 260—249 |
JOHN M. FORD, Primary Examiner
U.S. Cl. X.R.
8—1E, 54.2